United States Patent [19]

Foster

[11] Patent Number: 4,474,285
[45] Date of Patent: Oct. 2, 1984

[54] DRIVE UNIT MOUNT FOR RECIPROCATING FLOOR CONVEYOR

[76] Inventor: Raymond K. Foster, P.O. Box 1, Madras, Oreg. 97741

[21] Appl. No.: 346,863

[22] Filed: Feb. 8, 1982

[51] Int. Cl.³ .............................................. B65G 25/00
[52] U.S. Cl. ................................ 198/750; 414/525 B
[58] Field of Search ..................... 198/750; 414/525 B

[56] References Cited

U.S. PATENT DOCUMENTS

| | | | |
|---|---|---|---|
| 2,629,504 | 2/1953 | Peterson | 214/83.3 |
| 2,973,856 | 3/1961 | Brooks | 198/219 |
| 3,534,875 | 10/1970 | Hallstrom, Jr. | 214/83.3 |
| 4,143,760 | 3/1979 | Hallstrom | 198/750 |
| 4,144,963 | 3/1979 | Hallstrom | 198/750 |
| 4,184,587 | 1/1980 | Hallstrom | 198/750 |

Primary Examiner—Robert B. Reeves
Assistant Examiner—Russell D. Stormer
Attorney, Agent, or Firm—Delbert J. Barnard

[57] ABSTRACT

A unitary framework for a reciprocating floor conveyor is positioned within a space between a pair of longitudinally extending main beams (110), which may constitute portions of a preexisting support structure in a truck or trailer, for example. Telescopic tubular connector members (102) carried by a plurality of outwardly projecting support arms (18) are telescopically moved outwardly to place their outer ends against inner surface portions of the beams (110), and such outer ends of connector members (102) are welded to the beams (110). The telescopic engagement between these members (102) and the outwardly projecting arms (18) hold the framework in position. Then, the inner ends of these connector members (102) are welded to the arms (18), for completing the connection at these locations. The framework comprises a pair of longitudinally spaced apart, laterally extending king post trusses (10, 12), the apexes of which are directed downwardly. These trusses (10, 12) are interconnected by a pair of laterally spaced apart, longitudinally extending tie beams (14, 16). The tie beams (14, 16) are connected to the ends of, and form portions of, a pair of slide bearing assemblies (30, 32) which are carried by the two trusses (10, 12). These bearing assemblies (30, 32) include aligned guideways for receiving opposite end portions of longitudinal drive tubes (34, 36, 38).

12 Claims, 12 Drawing Figures

DRIVE UNIT MOUNT FOR RECIPROCATING FLOOR CONVEYOR

TECHNICAL FIELD

This invention relates to reciprocating floor conveyors, and more particularly to a structure and method for incorporating a drive unit for such a conveyor into a frame structure which includes a pair of laterally spaced apart beams which extend longitudinally through a central portion of a support frame for the conveyor.

BACKGROUND ART

The apparatus and method of this invention have use with a reciprocating type conveyor of the general type shown by U.S. Pat. No. 4,143,760, granted Mar. 13, 1979, and U.S. Pat. No. 4,184,587, granted Jan. 22, 1980, both to Olaf A. Hallstrom.

Earlier forms of reciprocating floor conveyors are disclosed by U.S. Pat. No. 2,629,504, granted in February of 1953 to Peterson; by U.S. Pat. No. 2,973,856, granted in March of 1961 to Brooks; by U.S. Pat. No. 3,534,875, granted in October of 1970 to Hallstrom; and by West German Patent Publication No. 1,296,087, published in May of 1969. These patents are not particularly pertinent to the subject invention and require no further comment.

DISCLOSURE OF THE INVENTION

The drive unit of the present invention is for a reciprocating conveyor of a type which includes a plurality of side-by-side arranged floor members.

The drive unit basically comprises a unitary framework which includes a pair of longitudinally spaced apart trusses. Each of the trusses is of a length which is slightly smaler than the lateral distance between the two main frame members to which the unit is to be attached. Each truss comprises an outwardly projecting beam portion at each of its ends. A pair of laterally spaced apart tie beams extends longitudinally between the two trusses and serves to connect them together. Each truss carries a guide bearing structure. Each guide bearing structure comprises means forming at least three guideways. Each guideway has an axis which extends in the direction of floor member movement. The axis of each guideway is aligned with the axis of a corresponding guideway carried by the opposite truss. A longitudinal drive tube is received in each aligned pair of guideways. A plurality of transverse drive beams, one for each drive tube, extends perpendicularly across the drive tubes. Each drive tube is secured to a related one of the drive beams in the vicinity where such members cross each other. Each transverse drive beam carries connector means by which it can be connected to a plurality of floor members.

In accordance with one aspect of the invention, a short securement tube member is associated with each outwardly projecting beam portion of each truss. Each such tube member is snugly received in a telescopic fashion, on its truss end beam portion. The securement tubes are retractable inwardly from the terminals of the projecting end beam portions of the trusses, so that with such members retracted, the unit can be positioned between the two main beams of the frame. The tubular members are then slid endwise outwardly, and their outer ends are welded to the two main frame members. Then, the inner ends of the securement tubes are welded to the end portions of the trusses, to in that manner, firmly secure the unit to the support frame.

The present invention also relates to certain economical and advantageous constructions of certain parts of the drive unit, and to a method of installing the drive unit.

BRIEF DESCRIPTION OF THE DRAWINGS

In the drawings, like element designations refer to like parts throughout, and

BEST MODE FOR CARRYING OUT THE INVENTION

Figure 1:
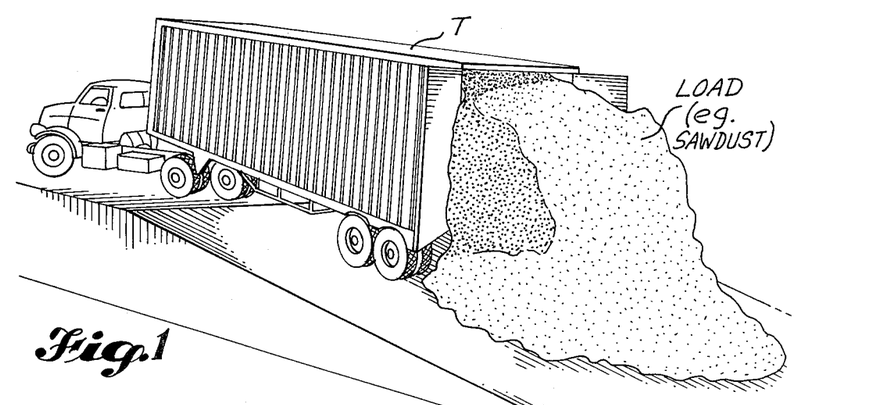
FIG. 1 is a pictorial view of a truck that is equipped with a reciprocating floor conveyor constructed in accordance with the present invention, shown in the process of using the conveyor to discharge its load.

FIG. 1 shows a load of sawdust or other bulk material being unloaded from a large truck T by use of a reciprocating floor conveyor within the truck T.

FIGS. 1-6 illustrate how the reciprocating floor conveyor works. These figures show two groups of floor members. Each group comprises three independent floor members designated 1, 2 and 3. The members "1" move together. The members "2" move together. And, the members "3" move together.

Figure 2:
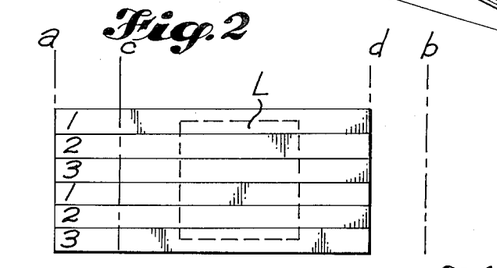
FIG. 2 is a top plan diagram of a conveyor which includes three floor members per group with each common floor member being identified by a common number, such conveyor being shown in a fully retracted position.
Figure 3:
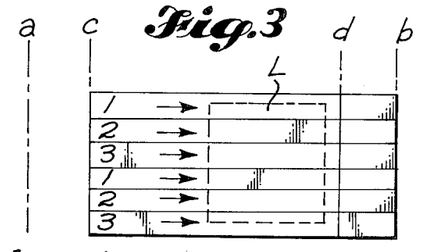
FIG. 3 is a view like FIG. 2, but showing all of the floor members being advanced in unison to convey a load in the direction indicated by arrows.
Figure 4:
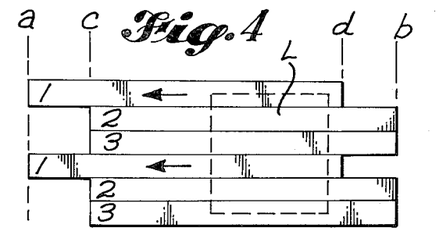
FIG. 4 is a view like FIGS. 2 and 3, showing floor members 2 and 3 stationary while floor members 1 are being retracted.
Figure 5:
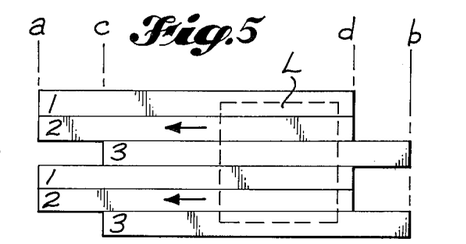
FIG. 5 is a view like FIGS. 2-4, but showing floor members 1 and 3 stationary while floor members 2 are being retracted.
Figure 6:
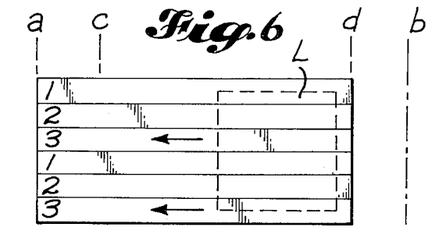
FIG. 6 is a view like FIGS. 2-5, but showing floor members 1 and 2 stationary and floor members 3 being retracted.

FIG. 2 shows all of the floor members in a retracted position in which common ends are aligned at a start station a. A load L is shown centrally positioned on the floor. FIG. 3 shows all of the floor members being advanced together to move the load L forwardly and the opposite ends of the floor members to a fully advanced position b. FIG. 4 shows the group "1" floor members being retracted and the groups "2" and "3" floor members held stationary. The load does not move because the frictional forces exerted on it by the stationary floor members are larger than the frictional forces exerted on it by the retracting floor members "1", FIG. 5 shows the next step in the sequence. The retracted floor members "1" and the still advanced floor members "3" are held stationary and the floor members "2" are retracted. Again, the load L does not move. FIG. 6 shows retracted floor members "1" and "2" stationary and floor members "3" being retracted. Again, the load L does not move. In this example, the load L has moved a distance equal to the endwise movement of the floor, viz. a–c or d–b.

Referring now to FIGS. 7–12, the drive unit which has been illustrated is of a modular form and is adapted to be installed within a space provided for it within a main support frame of a vehicle or stationary installation. Specifically, it is adapted to be mounted within a space between a pair of laterally spaced apart, longitudinally extending main frame members.

The unit or module comprises a pair of laterally extending, longitudinally spaced apart trusses 10, 12 which are innerconnected by a pair of tie beams 14, 16.

Figure 12:
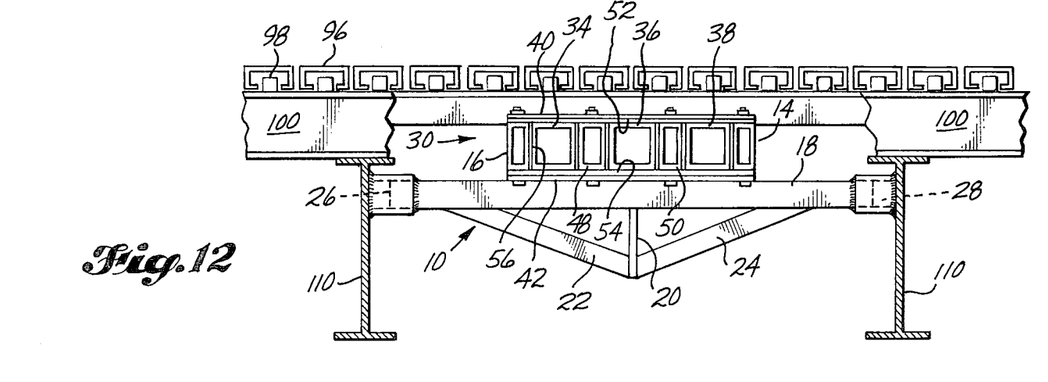
FIG. 12 is a cross-sectional view taken substantially along line 12—12 of FIG. 9.

The trusses 10, 12 may be identical in construction. Therefore, only truss 10 is illustrated (FIG. 12), it being understood that truss 12 is of a like construction. Referring to FIG. 12, each truss includes a transverse upper frame member 18 which may be constructed from thin wall steel tubing (e.g. 3"×3"). Each truss also includes a vertically depending, central member 20 which is welded at its top end to a central portion of the tube 18. A pair of diagonal members 22, 24 are provided, one on each side of member 20. The outer ends of the diagonal members 22, 24 are welded to the top member 18 at locations spaced inwardly from the terminal ends 26, 28 of member 18. Members 22, 24 slope downwardly and inwardly from such connections to the lower end portion of member 20 whereat they are welded to member 20.

Each truss 10, 12 carries a bearing assembly 30, 32. These bearing assemblies 30, 32 may be identical in construction. Therefore, only one is illustrated. The bearing assemblies 30, 32 provide slideways or slide bearings for longitudinal drive members 34, 36, 38. Drive members 34, 36, 38 are similar in operation to the drive members 46 disclosed in the aforementioned U.S. Pat. No. 4,184,587. However, my drive tubes are constructed from relatively large sized tubular steel stock, e.g. 3"×3". Also, the bearing assemblies 30, 32 exist apart from the upper members 18 of the trusses 10, 12. As a result, the upper truss members 18, and hence the trusses 10, 12 themselves, are not weakened any way, such as providing openings through them.

Referring to FIGS. 7–9 and 12, each guide bearing assembly 30, 32 comprises upper and lower metal plates 40, 42. Each lower plate 42 is welded to the upper cross member 18 of its truss 10, 12. Plate 40, at each of its ends, is bolted to an end portion of a tie beam 14, 16. Specifically, tie beams 14, 16 are lengths of tubular metal stock (e.g. steel tubing measuring about 1½"×3"). The ends of plates 40 are bolted to the upper walls of beams 14, 16. Each lower plate 42 is, at each of its ends, bolted or otherwise secured to the related end of a tie beam 14, 16.

Each bearing assembly 30, 32 further includes a pair of spacers 48, 50. Preferably, these spacers 48, 50, are short lengths of the same tubular stock that is used for the tie beams 14, 16. These spacers 48, 50 may also be bolted or otherwise secured to the top and bottom plates 40, 42, as shown in the drawing figures.

The openings which are vertically defined between the plates 40, 42, and horizontally between the members 16, 48, 50, 14 provide guideways for the drive tubes 34, 36, 38. These guideways are lined by sheet bearing material, e.g. synthetic thermoplastic resin such as Teflon (Trademark), Delrin (Trademark), polyethylene, etc., or some other suitable material having a low coefficient of friction.

As best shown by FIG. 12, upper and lower sheets 52, 54 may be sandwiched in between the plates 40 and 42 and the upper and lower surfaces of the members 14, 16, 48, 50. Additional sheets 56 of this same material are provided on the sides of the guideways. These sheets 56 may be glued in place.

The longitudinal drive beams 34, 36, 38 reciprocate within the guideways provided by the two bearing assemblies 30, 32. At one end the members 34, 36, 38 have apertured plates 41 at their ends outwardly from truss 12 by which they are pin connected to yokes provided at the outer ends of piston rods which emerge from a set of identical double acting hydraulic cylinders 43.

The assembly may also include a transverse frame 44 to which the opposite ends of the cylinders 43 are connected. Frame structure 44 may comprise a continuous tubular member 46 to which end portions of a plurality of parallel plates 45 are welded. A first group of tube sections 49, 51, 53, 55 are arranged in alignment with each other in a space relationship from tube 46. Tube members 46, 49, 51, 53, 55 may all be constructed from the same size tube stock, e.g. 3"×3". A second group of tube or block sections 58, 60, 62, 64 are positioned in the manner shown, to serve as spacers.

In similar fashion to the trusses 10, 12, the end portions of tubular frame members 46, 49, 55 project outwardly from the rest of the frame. The distance between the terminal ends 66 and 68 and the distance between the terminal ends 70, 72 are the same and, as in the case with the trusses 10, 12, these distances are slightly smaller than the lateral spacing of the truck frame members between which the assembly is to be installed.

Figure 7:
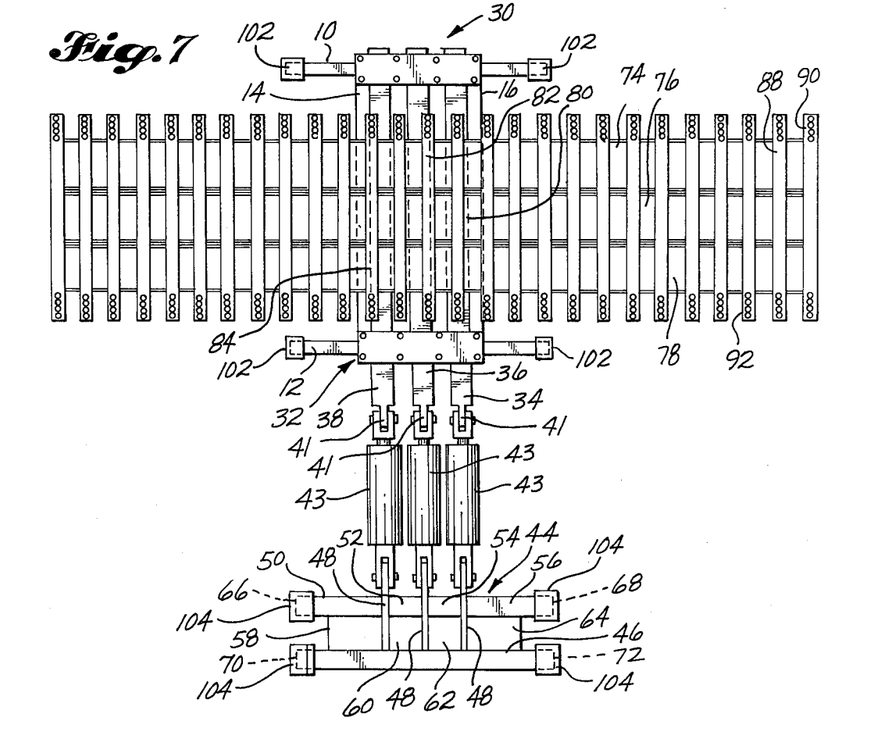
FIG. 7 is a top plan view of the modular unit.
Figure 8:
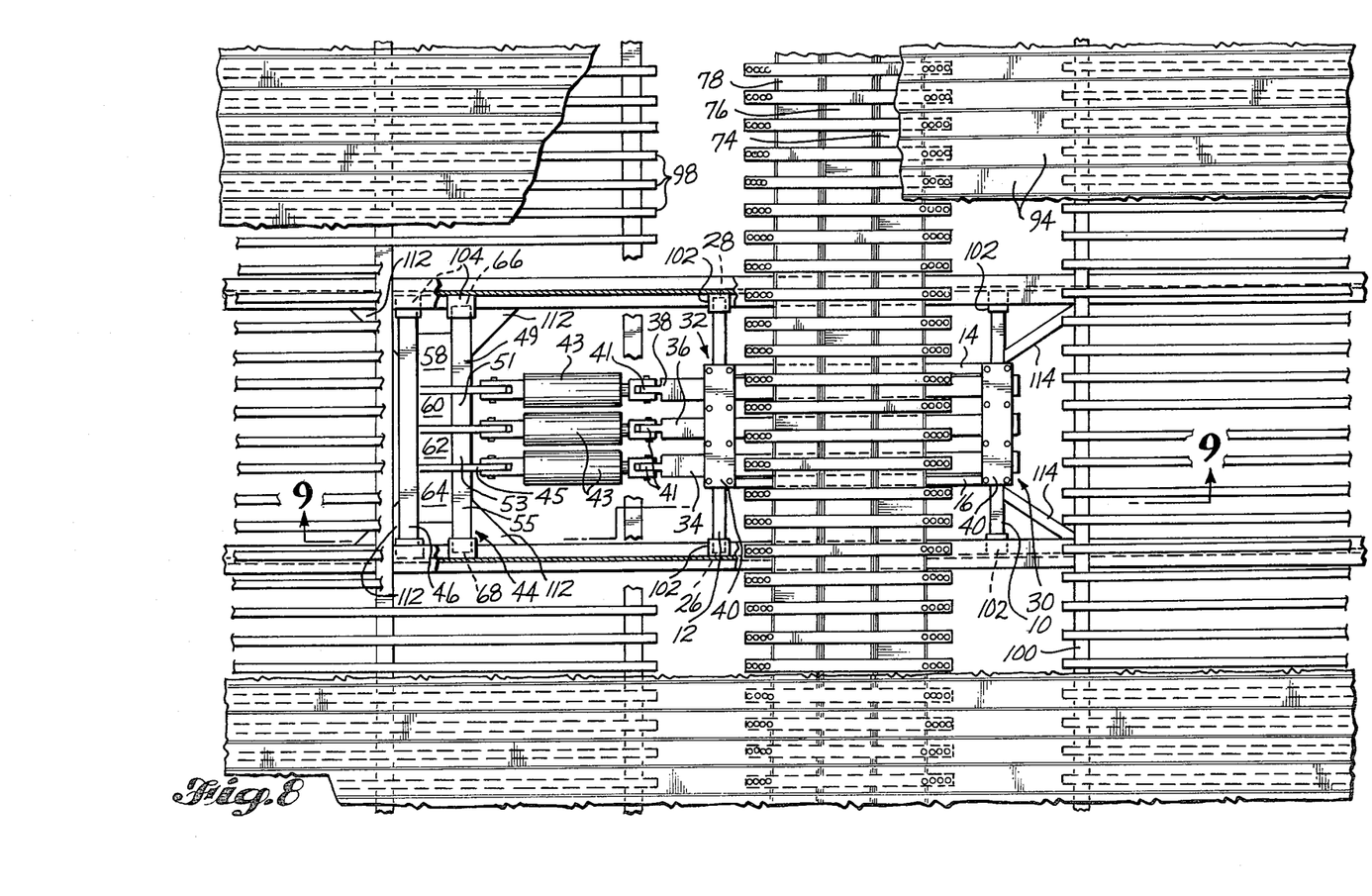
FIG. 8 is a fragmentary top plan view showing the modular drive unit installed, with the central foreground portion of the floor members cut away, and with portions of the guide beam cut away, for the purpose of better illustrating other components.
Figure 9:
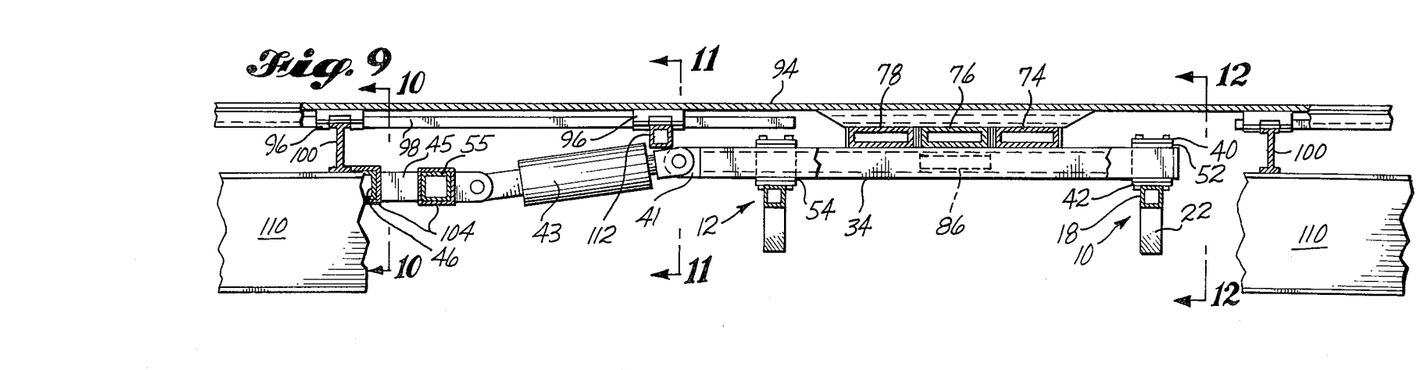
FIG. 9 is a longitudinal sectional view taken substantially along 9—9 of FIG. 8.

A plurality of transverse drive beams 74, 76, 78 extend across the unit between the trusses 10, 12, as shown by FIGS. 7 and 8. The transverse drive beams 74, 76, 78 equal in number the longitudinal drive beams 34, 36, 38. Beam 76 is welded to beam 34 at 80. Beam 74 is welded to beam 36 at 82. Beam 78 is welded to beam 38 at 84. A short piece of tubing is friction fit into each of the beams 34, 36, 38 in the vicinity of where they are welded to the beams 74, 76, 78. The stiffener tube within beam 34 is shown in FIG. 9 and is designated 86. It and the other tubes have an outside diameter which is approximately equal to the inside diameter of the beams 34, 36, 38. The fit is tight enough that the stiffener tubes have to be forced into the beams 34, 36, 38, such as by use of a hydraulic ram. Once in position, they will not move because of the tight frictional fit between them and the inner wall portions of the beams 34, 36, 38.

Each transverse drive beam 74, 76, 78 carries a plurality of connectors to which the floor members are connected (FIG. 8). Every third connector, each of which is designated 88 in FIG. 7, is connected to transverse drive beam 74 which in turn is connected to longitudinal drive beam 36. A second set of connectors 90 are connected to transverse drive beam 76 which in turn is connected to longitudinal drive beam 34. A third set of connectors 92 is connected to transverse drive member 78 which in turn is connected to longitudinal drive beam 38.

Of course, the number of groups of floor members, and hence the number of drive cylinders or equivalent drive means (e.g. screw jacks) can vary. The control system is not a part of the present invention and so it has not been specifically illustrated or described. However, a control system like that shown in the aforementioned U.S. Pat. No. 4,143,760 is preferred and the description of the operation of the cylinders and the components to which they are connected will correspond to the operating sequences which are disclosed in U.S. Pat. No. 4,143,760.

The floor members, designated 94 in FIG. 8 are connected to the connectors 88, 90, 92 in the pattern that has been described. These floor members 94 are otherwise free to slide and are mounted for sliding movement by means of a plurality of slide bearings 96 (FIG. 9) which are snap fitted onto longitudinal guide beams 98 where such beams cross and are welded to transverse support beams 100. These bearings and their relationship to the guide beams 98 and the cross beams 100 are described in a companion application filed herewith which is entitled "Improved Drive/Guide System For A Reciprocating Floor Conveyor", These components and their arrangement, per se, form no part of the present invention, and for that reason they will not be described in any further detail in this application.

Figure 10:
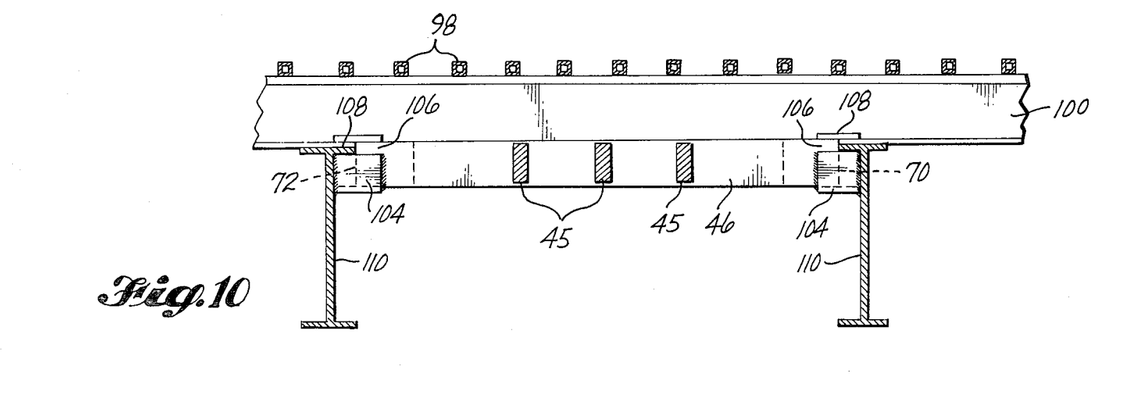
FIG. 10 is a cross-sectional view taken substantially along line 10—10 of FIG. 9.

In accordance with the present invention, a short tubular member 102, 104 is slip fit onto each projecting end portion of the trusses 10, 12 and each end portion of the frame member 44. The tubular members 104 may be cut at 106 (FIG. 10), to provide room for receiving the upper inner flange 108 in the event the two main frame members 110 are I-beams, as illustrated in FIG. 10.

When it is desired to install the drive unit, such unit is positioned between the two beams 110. The unit may be mounted onto a suitable jig frame (not shown) for transportation and for handling during the installation process. The unit is moved into position and supported in such position. Then, the tubular members 102, 104 are individually moved outwardly and at their outer ends are welded to side portions of the beams 110. At the conclusion of this welding, the drive unit will not go anywhere because of the telescopic engagement of the tube members 102, 104 and the end portions of the frame members. Next, the inner ends of the tube members 102, 104 are welded to the frame members. As shown in FIG. 8, additional strengthening gussets 112 and/or brace beams 114 may be added for strengthening the unit.

Figure 11:
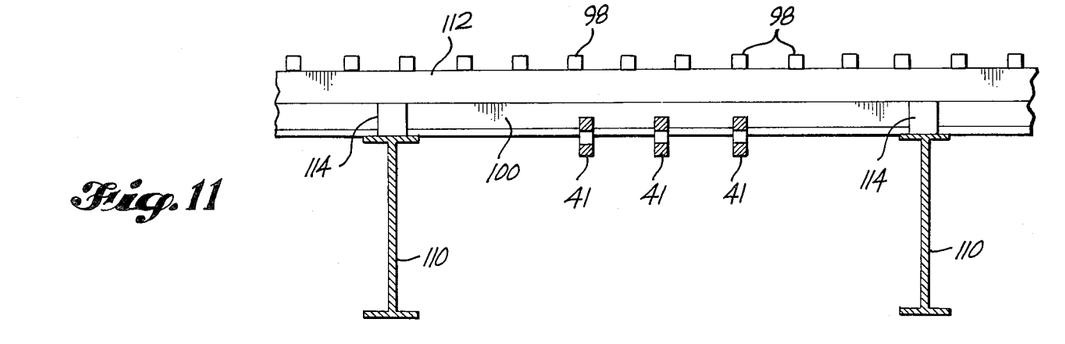
FIG. 11 is a cross-sectional view taken substantially along line 11—11 of FIG. 9.

Referring to FIGS. 9 and 11, a transverse support beam for the end portions of the guide beams 98 is needed within the vicinity of the power cylinders 43. There is insufficient room in this region for the I-beam type of members 100 which are used in the other regions of the floor. As shown in FIG. 11, a suitable transverse support for the end portions of the guide tubes 98, above the power units 43, may be provided in the form of a length of rectangular tubing 112 onto which downwardly depending short legs 114 of the same tubing material are welded. The lower ends of the legs 114 are welded to the top flanges of the beams 110.

In FIG. 11, the cylinders 43 and other background structure have been omitted from the view for the reason that they have no particular role in the reason for this view. A standard I-beam type cross member 100 is, however, shown in the background.

The transport and assembly jig may comprise a plurality of spaced apart longitudinal members which are connected together by a plurality of transverse members, to form a rigid frame structure to which the several components of the drive unit can be secured, such as by clamping. The use of a jig is desirable because the pivotal connections at the opposite ends of the drive cylinders 43 results in the unassembled unit being articulated at two locations.

In accordance with another aspect of the invention, the axes of the cylinders 43 are set at an angle so that the force lines through the axes of the cylinders 43 rise in the direction of the connectors 34, 36, 38. The angle of rise is relatively small. The benefit of this arrangement is that it results in an upward component force being applied to the connection of the piston rods to the drive tubes 34, 36, 38, when the pistons are extended, and a downward component when the pistons are retracted. The fact that the cylinders 43 are offset below the points of connections of the members 34, 36, 38 to the floor members 94 results in a tendency of the ends of members 34, 36, 38 opposite the pistons to rise during extension of the pistons. It also has the effect of the piston ends of the members 34, 36, 38 wanting to rise during retraction of the pistons. The angular setting of the cylinders 43 provide upward and downward components at the piston ends of the members 34, 36, 38 which at least partially neutralize the tendencies of the members 34, 36, 38 to bend.

I claim:

1. For use with a support frame for a reciprocating floor conveyor of a type comprising a plurality of side-by-side arranged floor members, said support frame being of a type comprising a pair of longitudinally extending main frame members which are laterally spaced apart a distance that is substantially less than the width of the conveyor, a drive unit comprising:

a unitary framework including a pair of laterally extending, longitudinally spaced apart transverse frame beams, each of which is of a length slightly smaller than the lateral distance between the two main frame members, and each of which includes a laterally outwardly projecting mounting end portion, and a pair of longitudinally extending, laterally spaced apart tie beams interconnecting intermediate portions of the two transverse frame beams;

a guide bearing structure carried by each said transverse frame beam, each said guide bearing structure comprising means forming at least three parallel guideways, each of which has an axis which extends in the direction of floor member movement, and each of which is aligned with a corresponding guideway carried by the other transverse frame beam;

a separate longitudinal drive rod disposed in each pair of aligned guideways;

a transverse drive beam for each drive rod, said transverse drive beams being perpendicular to the longitudinal drive rods, and each being secured to its drive rod where they cross each other;

said transverse drive beams being substantially longer than the distance between the two main frame members, and each including side wing portions which project outwardly beyond the two main frame members, said transverse drive beams each carrying connector means by which it can be connected to a plurality of floor members; and a short securement tube member associated with each end portion of each transverse frame beam, each such tube member being telescopically mounted onto its beam end portion and being movable inwardly along such beam end portion, such that the drive unit can be positioned between the two main frame members, and said tubular members can be slid outwardly and welded at their outer ends to the main frame members, and then at their inner ends to the end portions of the transverse frame beams, to in that manner secure the unit to the main frame members.

2. A drive unit according to claim 1, wherein each said transverse frame member is a tubular upper member of a truss which further comprises a pair of tubular diagonal members extending from outer end connections to the upper member, both downwardly and inwardly to a common connection, and a vertical member extending downwardly from a central portion of the upper member to a connection with the two diagonal members, wherein the outwardly projecting end portions of the upper member extend outwardly from where the diagonal members are connected to the upper member.

3. A drive unit according to claim 1, wherein each guide bearing structure comprises a transverse bottom plate which is connected to a central portion of the transverse frame member to which said guide bearing structure is connected, a transverse top plate spaced above the bottom plate, and wherein the tie beams include end portions which are sandwiched between end portions of the upper and lower plates, and spacer members which are laterally spaced apart from each other and from the tie means, sandwiched in between intermediate portions of the top and bottom plates, with the said guideways being formed vertically between the top and bottom plates and horizontally between the spacers and the tie beams.

4. A drive unit according to claim 3, wherein each guideway is lined by sheet plastic bearing material.

5. A drive unit according to claim 1, further comprising a laterally extending cross frame having outwardly projecting beam end portions, a short securement tube member telescopically received on each beam end portion, connector means on said cross frame generally alignable with the longitudinal drive rods, and a double acting hydraulic cylinder interconnected between each of said connector means and the adjacent end of the longitudinal drive tube in general alignment therewith.

6. A drive unit according to claim 2, wherein each guide bearing structure comprises a transverse bottom plate which is connected to a central portion of the transverse frame beam to which said guide structure is connected, a transverse top plate spaced above the bottom plate, and wherein the tie beams include end portions which are sandwiched between end portions of the upper and lower plates, and spacer members which are laterally spaced apart from each other and from the tie means, sandwiched in between intermediate portions of the top and bottom plates, with these said guideways being formed vertically between the top and bottom plates and horizontally between the spacers and the tie beams.

7. A drive unit according to claim 6, wherein each guideway is lined with sheet plastic bearing material.

8. A drive unit according to claim 7, further comprising a laterally extending cross frame having outwardly projecting beam end portions, a short securement tube member telescopically received on each beam end portion, connector means on said cross frame generally alignable with the longitudinal drive rods, and a double acting hydraulic cylinder interconnected between each of said connector means and the adjacent end of the longitudinal drive tube in general alignment therewith.

9. A drive unit according to claim 2, further comprising a laterally extending cross frame having outwardly projecting beam end portions, a short securement tube member telescopically received on each beam end portion, connector means on said cross frame generally alignable with the longitudinal drive rods, and a double acting hydraulic cylinder interconnected between each of said connector means and the adjacent end of the longitudinal drive tube in general alignment therewith.

10. A drive unit according to claim 6, further comprising a laterally extending cross frame having outwardly projecting beam end portions, a short securement tube member telescopically received on each beam end portion, connector means on said cross frame generally alignable with the longitudinal drive rods, and a double acting hydraulic cylinder interconnected between each of said connector means and the adjacent end of the longitudinal drive tube in general alignment therewith.

11. A method of installing a drive unit for a reciprocating floor conveyor between two laterally spaced apart, longitudinally extending main frame members, comprising:

providing a support frame structure for supporting and guiding a plurality of longitudinally extending drive beams, and a like number of transverse guide beams extending across the longitudinal drive beams, and each being connected to a separate related longitudinal drive beam where they cross each other, and each carrying a plurality of connectors for connecting it to a plurality of floor members;

providing on the frame structure, at each longitudinal end thereof, a pair of laterally outwardly and oppositely projecting, elongated beam members;

providing each said outwardly projecting beam member with a telescopic securement tube;

retracting each securement tube inwardly along its beam member;

positioning the drive unit between the two longitudinal main frame members;

sliding the connector tubes outwardly and at their outer ends welding them to the longitudinal main frame members; and then welding the inner ends of the securement tubes to the outwardly projecting beam members.

12. A method in accordance with claim 11, further comprising:

providing an independent cross frame having at least one laterally outwardly projecting beam member at each of its ends;

providing a securement tube on each said outwardly projecting beam member;

telescopically retracting each securement tube inwardly along its beam members;

positioning such cross frame between the two longitudinally extending main frame members, at a position spaced axially from the support frame structure;

telescopically moving the securement tubes outwardly and welding their outer ends to the longitudinal main frame member;
then welding the inner ends of said securement tubes to the cross frame; and
innerconnecting a plurality of reversible, linear drive units between end portions of the longitudinal drive beams and central portions of the cross frame.

* * * * *